(12) United States Patent
Bergström et al.

(10) Patent No.: US 12,543,099 B2
(45) Date of Patent: Feb. 3, 2026

(54) RADIO NETWORK NODE, USER EQUIPMENT, AND METHODS PERFORMED THEREIN

(71) Applicant: Telefonaktiebolaget LM Ericsson (publ), Stockholm (SE)

(72) Inventors: Mattias Bergström, Sollentuna (SE); Helka-Liina Määttänen, Espoo (FI); Antonino Orsino, Kirkkonummi (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 311 days.

(21) Appl. No.: 18/260,648

(22) PCT Filed: Jan. 13, 2022

(86) PCT No.: PCT/SE2022/050024
§ 371 (c)(1),
(2) Date: Jul. 7, 2023

(87) PCT Pub. No.: WO2022/154726
PCT Pub. Date: Jul. 21, 2022

(65) Prior Publication Data
US 2024/0064598 A1 Feb. 22, 2024

Related U.S. Application Data

(60) Provisional application No. 63/137,195, filed on Jan. 14, 2021.

(51) Int. Cl.
*G08G 5/22* (2025.01)
*H04W 36/32* (2009.01)
*H04W 36/36* (2009.01)

(52) U.S. Cl.
CPC ............ *H04W 36/362* (2023.05); *G08G 5/22* (2025.01); *H04W 36/328* (2023.05)

(58) Field of Classification Search
CPC ............. H04W 36/326; H04W 36/328; H04W 36/362; G08G 5/22
(Continued)

(56) References Cited

U.S. PATENT DOCUMENTS 9,376,208 B1 * 6/2016 Gentry ...................... G08G 5/55
10,034,209 B1 * 7/2018 Nandan ............ H04W 36/0061
(Continued)

FOREIGN PATENT DOCUMENTS

WO 2019099386 A1 5/2019
WO 2021134632 A1 7/2021

OTHER PUBLICATIONS

"3rd Generation Partnership Project; Technical Specification Group Radio Access Network; NR; Radio Resource Control (RRC) protocol specification (Release 16)", 3GPP TS 38.331 V16.6.0, Sep. 2021, 961 pages.
(Continued)

*Primary Examiner* — Jinsong Hu
(74) *Attorney, Agent, or Firm* — Murphy, Bilak & Homiller, PLLC

(57) ABSTRACT

Embodiments herein relate to, for example, a method performed by a UE (10) for handling communication in a wireless communication network. The UE (10) determines whether the UE (10) is flying or not; and checks one or more conditions related to a handover of the UE (10), wherein the one or more conditions are based on whether the UE (10) is determined to fly or not.

11 Claims, 13 Drawing Sheets

(58) Field of Classification Search
USPC ......................................................... 455/436
See application file for complete search history.

(56) References Cited

U.S. PATENT DOCUMENTS

| | | | | |
|---|---|---|---|---|
| 11,490,246 | B2* | 11/2022 | Phuyal | ..................... H04B 7/15 |
| 11,974,186 | B2* | 4/2024 | Murphy | .......... H04W 36/00837 |
| 2016/0205560 | A1* | 7/2016 | Hyslop | .............. H04B 7/18506 |
| | | | | 455/454 |
| 2017/0126512 | A1* | 5/2017 | Seed | ........................ H04L 67/51 |
| 2018/0004231 | A1* | 1/2018 | Michini | ............... G05D 1/0094 |
| 2018/0077671 | A1* | 3/2018 | Lee | ..................... H04W 64/006 |
| 2018/0324662 | A1* | 11/2018 | Phuyal | ................. H04W 48/16 |
| 2018/0341004 | A1* | 11/2018 | Kautz | ................... G01S 5/0249 |
| 2019/0045406 | A1* | 2/2019 | Kalathil | ............ H04W 36/0094 |
| 2019/0182730 | A1* | 6/2019 | Yeh | ....................... H04W 24/10 |
| 2019/0212724 | A1* | 7/2019 | Phuyal | ................. H04W 76/32 |
| 2019/0335348 | A1* | 10/2019 | Hou | ........................ H04W 4/46 |
| 2020/0192348 | A1* | 6/2020 | Koziol | ............... H04W 36/322 |
| 2020/0236602 | A1* | 7/2020 | Mahkonen | ............ H04W 76/25 |
| 2020/0383029 | A1* | 12/2020 | Takeda | ............... H04W 36/324 |
| 2021/0012665 | A1* | 1/2021 | Wang | ....................... G08G 5/30 |
| 2022/0386208 | A1* | 12/2022 | Phuyal | ..................... G08G 5/57 |
| 2024/0040464 | A1* | 2/2024 | Hong | ................ H04W 36/0005 |
| 2024/0224022 | A1* | 7/2024 | Paczkowski | ............ H04W 8/18 |
| 2025/0216432 | A1* | 7/2025 | Zhang | .................... G05D 1/247 |

OTHER PUBLICATIONS

"3rd Generation Partnership Project; Technical Specification Group Radio Access Network; Study on Enhanced LTE Support for Aerial Vehicles (Release 15)", 3GPP TR 36.777 V15.0.0, Dec. 2017, 89 pages.

"Analysis and Simulation of Handover Issues for Drones", 3GPP TSG-RAN WG2 Meeting #99, R2-1708544, Huawei, HiSilicon, Berlin, Germany, Aug. 21-25, 2017, 9 pages.

3GPP, "3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331 V16.0.0, Mar. 2020, 1-1048.

Muruganathan, Siva D., et al., "An Overview of 3GPP Release-15 Study on Enhanced LTE Support for Connected Drones", arXiv: 1805.00826, 2018, 7 pages.

"Analysis and Simulation of Handover Issues for Drones", 3GPP TSG-RAN WG2 Meeting #99, R2-1708544, Revision of R2-1709734, Huawei, HiSilicon, Berlin, Germany, Aug. 21-25, 2017, 9 pages.

* cited by examiner

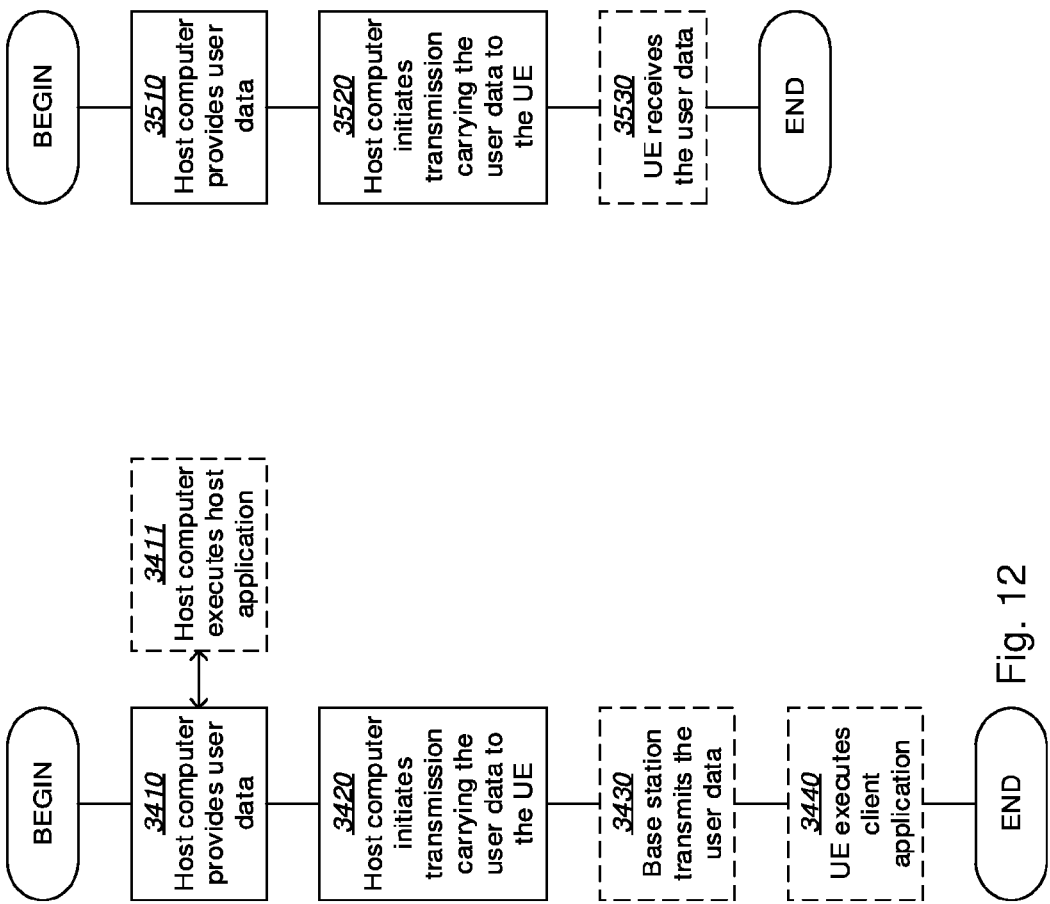

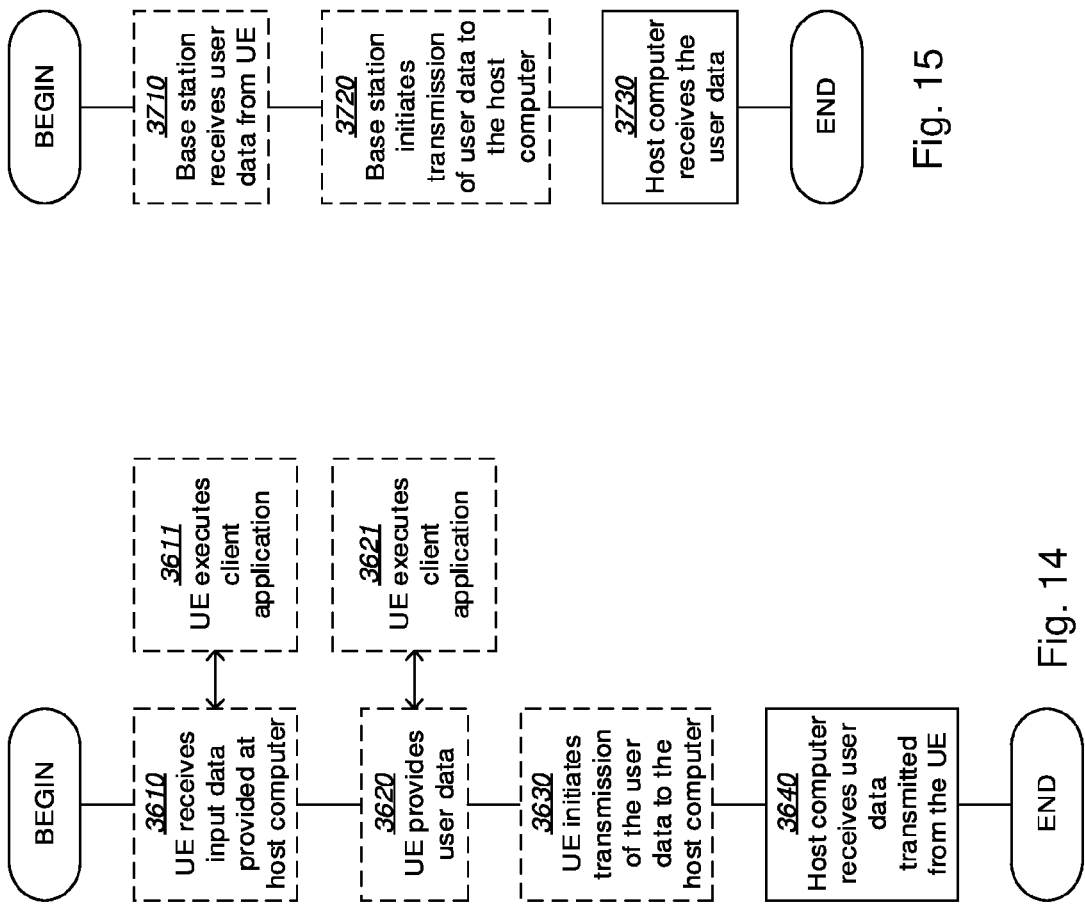

RADIO NETWORK NODE, USER EQUIPMENT, AND METHODS PERFORMED THEREIN

TECHNICAL FIELD

Embodiments herein relate to a radio network node, a user equipment (UE) and methods performed therein regarding wireless communication. Furthermore, a computer program and a computer readable storage medium are also provided herein. In particular, embodiments herein relate to handling handovers of UEs in a wireless communications network.

BACKGROUND

In a typical wireless communications network, UEs, also known as wireless communication devices, mobile stations, stations (STA) and/or wireless devices, communicate via a Radio Access Network (RAN) with one or more core networks (CN). The RAN covers a geographical area which is divided into service areas or cells, with each service area or cell being served by a radio network node such as an access node e.g. a Wi-Fi access point or a radio base station (RBS), which in some networks may also be called, for example, a NodeB, a gNodeB, or an eNodeB. The service area or cell is a geographical area where radio coverage is provided by the radio network node. The radio network node operates on radio frequencies to communicate over an air interface with the UEs within range of the radio network node. The radio network node communicates over a downlink (DL) to the UE and the UE communicates over an uplink (UL) to the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipment. In a forum known as the Third Generation Partnership Project (3GPP), telecommunications suppliers propose and agree upon standards for present and future generation networks and investigate e.g. enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the 3GPP and other 3GPP releases, such as New Radio (NR), are worked on. The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

With the emerging 5G technologies such as NR, the use of very many transmit- and receive-antenna elements may be of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

The Release (Rel)-15 work item on enhanced LTE support for aerial vehicles is based on the preceding study item whose outcome was documented in 3GPP TR 36.777 v.15.6.0. The work item aims to specify features that can improve the efficiency and robustness of terrestrial LTE network for providing aerial connectivity services, particularly for low altitude unmanned aerial vehicles a.k.a., aerial UEs.

A flying mode detection is an important issue. The flying mode detection is also related to interference detection as the interference conditions for flying aerial UEs are different from aerial UE in terrestrial mode. For interference detection, which may also serve as input to flying mode detection, an enhancement to existing events triggering of reference signal received power (RSRP)/reference signal received quality (RSRQ)/reference signal (RS)-signal to interference plus noise ratio (SINR) reports was introduced in LTE Rel-15. The UE may be configured to trigger an event such as A3, A4, A5, which all consider neighbor cell measurements. In such event triggers, a measurement report is triggered when multiple cells' measured RSRPs, RSRQs or RS-SINRs, are above a threshold. For example, event A3 triggers when neighbor cell measured RSRP becomes better than the measured RSRP of primary cell (PCell) or primary secondary cell (PSCell) by a certain amount. The enhanced triggering introduced in LTE Rel-15 would require, e.g., three neighbor cell RSRP values to become higher than the PCell/PSCell RSRP value by a certain amount in order to trigger a measurement report.

Another input to flying mode detection is event triggered height and location reporting. A new configurable event within radio resource management (RRM) with height threshold is introduced for Rel-15 Aerial UEs. When the UE is configured with an event, a report is triggered when UE's altitude crosses the threshold altitude. In addition to flying mode detection, the exact height information is considered useful as the network may choose to reconfigure for example measurement reporting configurations for the UE when it crosses a height threshold. FIG. 1 depicts this situation. In FIG. 1, when the UE is below a height of 100 m, the aerial UE is radio resource control (RRC) configured with measurement reporting configurations and event triggered height/location reporting corresponding to a height threshold of 200 m. As the aerial UE crosses a height threshold of 200 m, a report is trigged from the UE to the network. After receiving the report from the aerial UE, the network RRC reconfigures the aerial UE with new measurement reporting configurations.

FIG. 1 shows where E-UTRAN reconfigures Aerial UE based on flying altitude.

For aerial UEs, the DL interference and the down-titled base station (BS) antennas contribute to a worse perceived SINR, a fast-changing best cell and possibly a faraway best cell, compared to the terrestrial UEs. One proposal to solve this has been to scale the time-to-trigger (TTT) parameter for a UE, which TTT defines when a measurement result is sent by the UE after an event is triggered. When the UE is airborne, it is beneficial to trigger measurement results earlier compared to terrestrial UEs. This is similar to what already exists in LTE specification where TTT can be scaled based on a mobility state of the UE, where a mobility state is defined as a number of handovers (HO) seen by the UE based on certain configuration. Similarly, in idle mode of LTE, a cell reselection threshold can be scaled based on UEs mobility state. This has also been proposed for aerial UEs based on height or airborne status.

Conditioning the information element (IE) for measurement reporting configuration with airborne status or height is possible due to the LTE radio resource management (RRM) measurement framework. A measurement object (MO) points to an EUTRAN carrier and different reporting configurations may be linked to the same MO. Each linkage is identified by a measurement ID.

See the following IE's for reference:
The IE MeasId is used to identify the linking of a measurement object and a reporting configuration.
The IE MeasObjectId is used to identify a measurement object configuration.
The IE ReportConfigId is used to identify a measurement reporting configuration.
MeasIdToAddModList Information Element while a UE is moving, e.g., when a handover between cells fails, or when a connection fails even before a handover (HO) is triggered.

In conditional handover, instead of preparing one target cell as in the legacy case, multiple candidate target cells are prepared in advance in the network, which enables the handover command to be sent to the UE earlier than at legacy handover when the radio conditions are still good, rather than when conditions start to get degraded. When received, the UE stores the command, instead of applying it immediately. The UE only applies the stored command when a condition configured by the network is satisfied for one of the configured candidate target cells. Then the UE executes the handover and connects to the target node as in legacy handover.

In conditional handover, instead of transmitting the measurement report, the UE applies the stored message when condition is satisfied. It is also possible to configure two conditions for the UE and associate both to the stored command, i.e., the command is applied only if both condi-

```
-- ASN1START
  MeasIdToAddModList ::=                    SEQUENCE (SIZE (1..maxMeasId)) OF
MeasIdToAddMod
  MeasIdToAddModList-v1310 ::=              SEQUENCE (SIZE (1..maxMeasId)) OF
MeasIdToAddMod-v1310
  MeasIdToAddModListExt-r12 ::=             SEQUENCE (SIZE (1..maxMeasId)) OF
MeasIdToAddModListExt-r12
  MeasIdToAddModListExt-v1310 ::=           SEQUENCE (SIZE (1..maxMeasId)) OF
MeasIdToAddMod-v1310
  MeasIdToAddMod ::=   SEQUENCE {
    measId                                  MeasId,
    measObjectId                            MeasObjectId,
    reportConfigId                          ReportConfigId
  }
  MeasIdToAddModExt-r12 ::=   SEQUENCE
{
    measId-v1250                            MeasId-v1250,
    measObjectId-r12                        MeasObjectId,
    reportConfigId-r12                      ReportConfigId
  }
  MeasIdToAddMod-v1310 ::=   SEQUENCE {
    measObjectId-v1310                      MeasObjectId-v1310
  OPTIONAL
  }
-- ASN1STOP
```

The same structure for RRM is adopted in NR as per 3GPP TS 38.331 v.16.0.0, and thus what is described here is valid for NR as well.

SUMMARY

As part of developing embodiments herein one or more problems have been identified.

When the radio link becomes degraded and the UE needs to send measurement reports, it is possible that those reports never reach the network since the uplink link is degraded or even if they do, the network tries to respond with a handover command that may never reach the UE, either since the downlink is degraded or the handover command is so large that multiple transmissions are required. In a Non-Terrestrial Network (NTN), even if the UE may know how long a satellite may serve before the service link switch, e.g., with the help of ephemeris data, channel conditions, such as certain terrain, may still yield limited accessibility, e.g., when a UE is shadowed by a mountain. FIG. 2 shows when these two cases might happen.

The main motivation of a conditional handover (CHO) mechanism is to reduce the number of failure occurrences tions are fulfilled, e.g., conditions configured for different types of measurement quantities, like cell coverage represented by RSRP, and quality represented by RSRQ.

When the UE executes the handover in one of the prepared cells, the radio network node hosting this cell can inform the source cell that the UE successfully performed the handover in its cell, so that the source cell can cancel the resources reserved by the remaining target candidate cells. Considering that the time between the handover preparation, and thus resource reservation, is not known, the source cell can release such resources by informing target candidate cells before the UE executes the handover. It is important to select the candidate target cells and keep the number to a limited amount since a set of resources would need to be reserved while the UE is monitoring for the configured condition.

The network may support early or late data forwarding on the user plane depending on performance requirements of that particular connection. In early data forwarding, data is forwarded during the preparation phase and the main benefit is to enable similar interruption performance as legacy, while increasing robustness. However, the complexity and inter-node transmission resource consumption increases with the number of target cell candidates and the time it takes until the handover is actually performed. Late data forwarding is a simpler alternative, when data starts to be forwarded by the source cell when the UE accesses the target cell. The benefit is that the serving cell only forwards data to a single neighbour cell, i.e., target cell, even if multiple cells have been prepared, and forwarding only starts after the UE accesses the target cell once the condition is fulfilled.

It is also possible that a failure is detected while the UE is monitoring the configured conditions. In legacy, the UE would perform cell selection and continue with a re-establishment procedure. However, with conditional handover, when the same type of failure is detected, e.g., a radio link failure or handover failure, the UE can prioritize a cell for which it has a stored handover command and, instead of performing re-establishment, it performs a conditional handover, which reduces the interruption time and the signalling over the air interface.

FIG. 3 shows a simplified message diagram for an inter-gNB Conditional Handover. The RRCReconfiguration* indicated with an asterisk ('*') is the Handover Command containing the RRC reconfiguration the UE shall apply if/when connecting to the candidate target gNB.

Currently the CHO can be configured for multiple target cells and each target cell may be configured with max two events. However, when the events are evaluated, the cell triggers if either of the events is fulfilled as marked below as underlined text. This works with current CHO where there are only two RSRP based events defined for CHO.

CondReconfigToAddModList Information Element

```
-- ASN1START
-- TAG-CONDRECONFIGTOADDMODLIST-START
CondReconfigToAddModList-r16 ::= SEQUENCE (SIZE (1.. maxNrofCondCells-r16)) OF CondReconfigToAddMod-r16
CondReconfigToAddMod-r16 ::=   SEQUENCE {
    condReconfigId-r16        ,
    condExecutionCond-r16     SEQUENCE (SIZE (1..2)) OF MeasId
OPTIONAL,   -- Cond condReconfigAdd
    condRRCReconfig-r16       OCTET STRING (CONTAINING
RRCReconfiguration)    OPTIONAL,   -- Cond condReconfigAdd
    ...
}
-- TAG-CONDRECONFIGTOADDMODLIST-STOP
-- ASN1STOP
```

| CondReconfigToAddMod field descriptions |
|---|
| condExecutionCond |
| The execution condition that needs to be fulfilled in order to trigger the execution of a conditional reconfiguration. When configuring 2 triggering events (Meas Ids) for a candidate cell, network ensures that both refer to the same measObject. |
| condRRCReconfig |
| The RRCReconfiguration message to be applied when the condition(s) are fulfilled. The RRCReconfiguration message contained in condRRCReconfig cannot contain the field conditionalReconfiguration or the field daps-Config. |

| Conditional Presence | Explanation |
|---|---|
| condReconfigAdd | The field is mandatory present when a condReconfigId is being added. Otherwise the field is optional, need M. |

1> 5.3.5.13 Conditional Reconfiguration
2> 5.3.5.13.1 General

The network configures the UE with one or more candidate target SpCells in the conditional reconfiguration. The UE evaluates the condition of each configured candidate target SpCell. The UE applies the conditional reconfiguration associated with one of the target SpCells which fulfils associated execution condition. The network provides the configuration parameters for the target SpCell in the ConditionalReconfiguration IE.

3> 5.3.5.13.4 Conditional Reconfiguration Evaluation

The UE shall:
1> for each condReconfigId within the VarConditionalReconfg:
  2> consider the cell which has a physical cell identity matching the value indicated in the ServingCellConfigCommon included in the reconfigurationWithSync in the received condRRCReconfg to be applicable cell;
  2> for each measId included in the measIdList within VarMeasConfig indicated in the condExecutionCond associated to condReconfigId:
    3> if the entry condition(s) applicable for this event associated with the condReconfigId, i.e. the event corresponding with the condEventId(s) of the corresponding condTriggerConfig within VarConditionalReconfig, is fulfilled for the applicable cells for all measurements after layer 3 filtering taken during the corresponding timeToTrigger defined for this event within the VarConditionalReconfg:
      4> consider the event associated to that measId to be fulfilled;
    3> if the leaving condition(s) applicable for this event associated with the condReconfigId, i.e. the event corresponding with the condEventId(s) of the corresponding condTriggerConfig within VarConditionalReconfig, is fulfilled for the applicable cells for all measurements after layer 3 filtering taken during the corresponding timeToTrigger defined for this event within the VarConditionalReconfig:
      4> consider the event associated to that measId to be not fulfilled;
  2> if event(s) associated to all measId(s) within condTriggerConfig for a target candidate cell within the stored condRRCReconfig are fulfilled:
    3> consider the target candidate cell within the stored condRRCReconfig, associated to that condReconfigId, as a triggered cell;
    3> initiate the conditional reconfiguration execution, as specified in 5.3.5.13.5;
NOTE: Up to 2 MeasId can be configured for each condReconfigId. The conditional reconfiguration event of the 2 MeasId may have the same or different event conditions, triggering quantity, time to trigger, and triggering threshold.

4>5.3.5.13.5 Conditional Reconfiguration Execution
The UE shall:
1> if more than one triggered cell exists:
2> select one of the triggered cells as the selected cell for conditional reconfiguration execution;
1> for the selected cell of conditional reconfiguration execution:
2> apply the stored condRRCReconfg of the selected cell and perform the actions as specified in 5.3.5.3;
NOTE: If multiple NR cells are triggered in conditional reconfiguration execution, it is up to UE implementation which one to select, e.g. the UE considers beams and beam quality to select one of the triggered cells for execution.

Herein it is herein suggested possible one or more enhancements to address CHO for UEs in flight mode.

An object herein is to provide a mechanism to handle communication of aerial UEs in an efficient manner in the wireless communications network.

According to an aspect the object is achieved, according to embodiments herein, by providing a method performed by a UE for handling communication in a wireless communication network. The UE determines whether the UE is flying or not, and checks one or more conditions related to a handover of the UE, wherein the one or more conditions are based on whether the UE is determined to fly or not.

According to another aspect the object is achieved, according to embodiments herein, by providing a method performed by a radio network node for handling communication in a wireless communications network. The radio network node configures the UE to determine whether the UE is flying or not, and to check one or more conditions related to a handover of the UE, wherein the one or more conditions are based on whether the UE is determined to fly or not.

According to still another aspect the object is achieved, according to embodiments herein, by providing a UE for handling communication in a wireless communication network. The UE is configured to determine whether the UE is flying or not, and to check one or more conditions related to a handover of the UE, wherein the one or more conditions are based on whether the UE is determined to fly or not.

According to yet another aspect the object is achieved, according to embodiments herein, by providing a radio network node for handling communication in a wireless communications network. The radio network node is configured to configure a UE to determine whether the UE is flying or not, and to check one or more conditions related to a handover of the UE wherein the one or more conditions are based on whether the UE is determined to fly or not.

It is furthermore provided herein a computer program product comprising instructions, which, when executed on at least one processor, cause the at least one processor to carry out the method above, as performed by the UE or the radio network node, respectively. It is additionally provided herein a computer-readable storage medium, having stored thereon a computer program product comprising instructions which, when executed on at least one processor, cause the at least one processor to carry out the method according to the method above, as performed by the UE or the radio network node, respectively.

Embodiments herein disclose one or more procedures to adapt CHO procedures to aerial UEs. For example, when the UE is flying, the condition of a CHO such as a time-to-trigger may be shorter as the cell coverage is more scattered on the sky as the UE is served by sidelobes from radio network nodes. Thus, the CHO procedural text can be changed such that there is one event related to the cell ("is the UE aerial?") that needs to be fulfilled in order for the UE to check if the other event is fulfilled, e.g., level of signal strength. For example, the UE may automatically apply shorter TTT or otherwise more suitable configuration for mobility when it has determined to be flying. The automation is done by using CHO related procedures.

This has the benefit that a handover may be executed faster in case the UE is flying since the UE can apply, for example, a shorter TTT of one CHO configuration when the UE is flying. That results in that the UE will not stay in the old cell a long time before the conditional handover is executed hence reducing the amount of time the UE is served by the old cell. Note that the old cell may likely have worse radio condition than the new cell. Thus, embodiments herein provide a reliable communication for a flying UE in an efficient manner.

BRIEF DESCRIPTION OF THE DRAWINGS

Embodiments will now be described in more detail in relation to the enclosed drawings, in which:

FIGS. 12-15 are flowcharts illustrating methods implemented in a communication system including a host computer, a base station and a user equipment.

DETAILED DESCRIPTION

Figure 1:
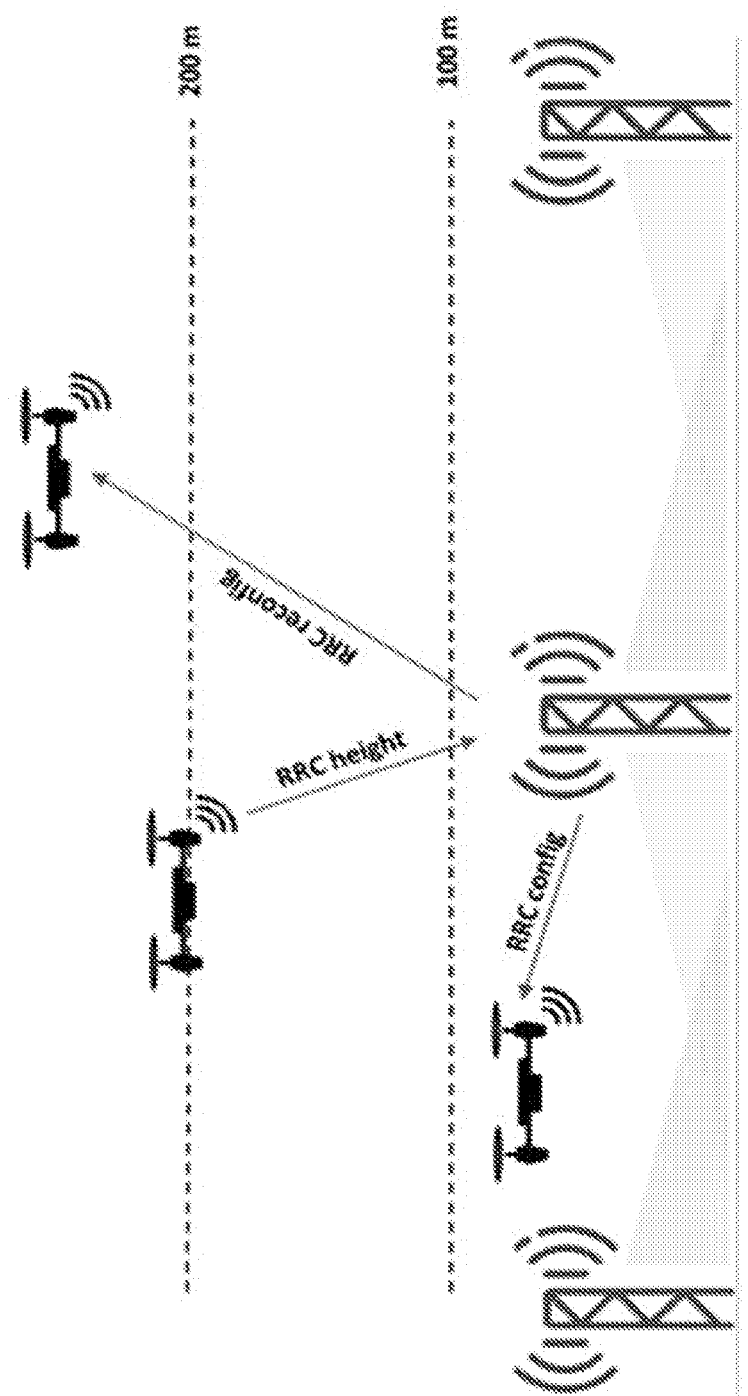
FIG. 1 shows a schematic overview depicting an aerial UE being configured according to prior art.
Figures 2A, 2B:
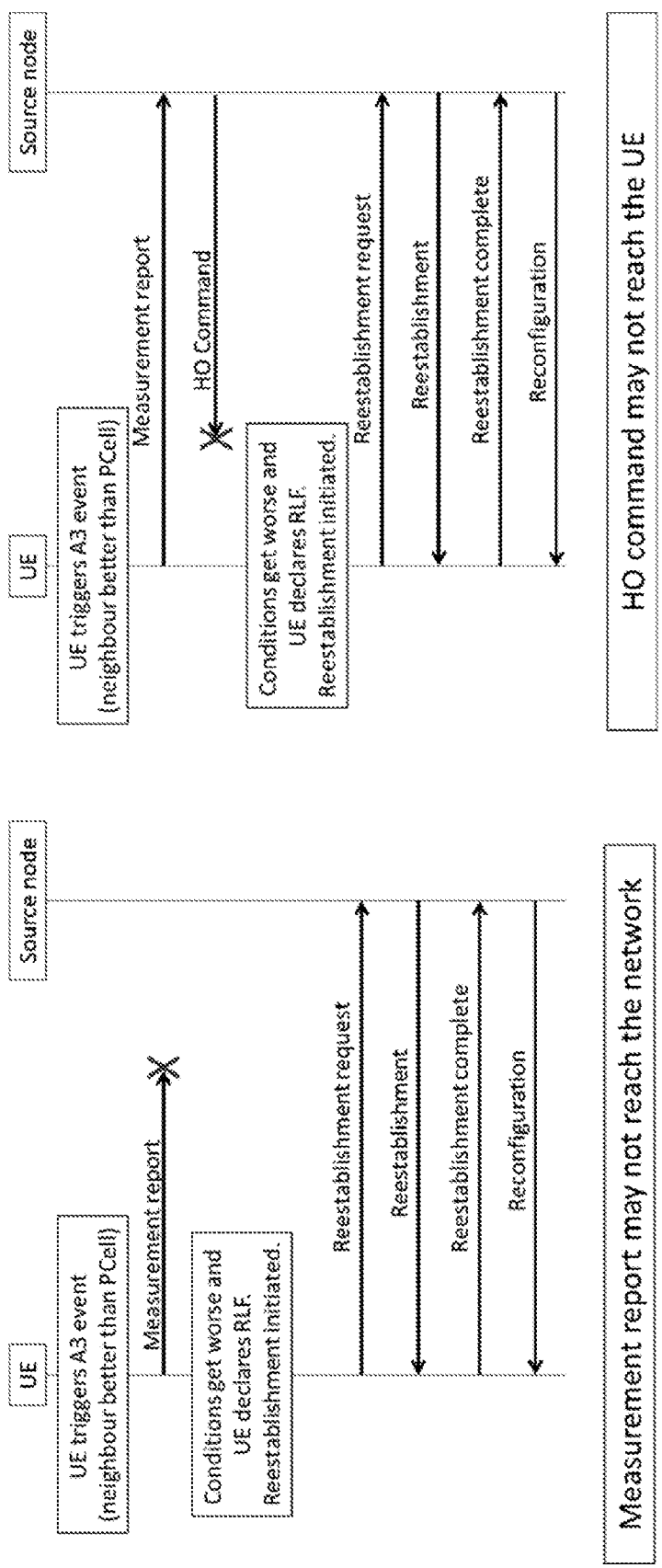
FIGS. 2a-2b show HO signalling according to prior art.
Figure 3:
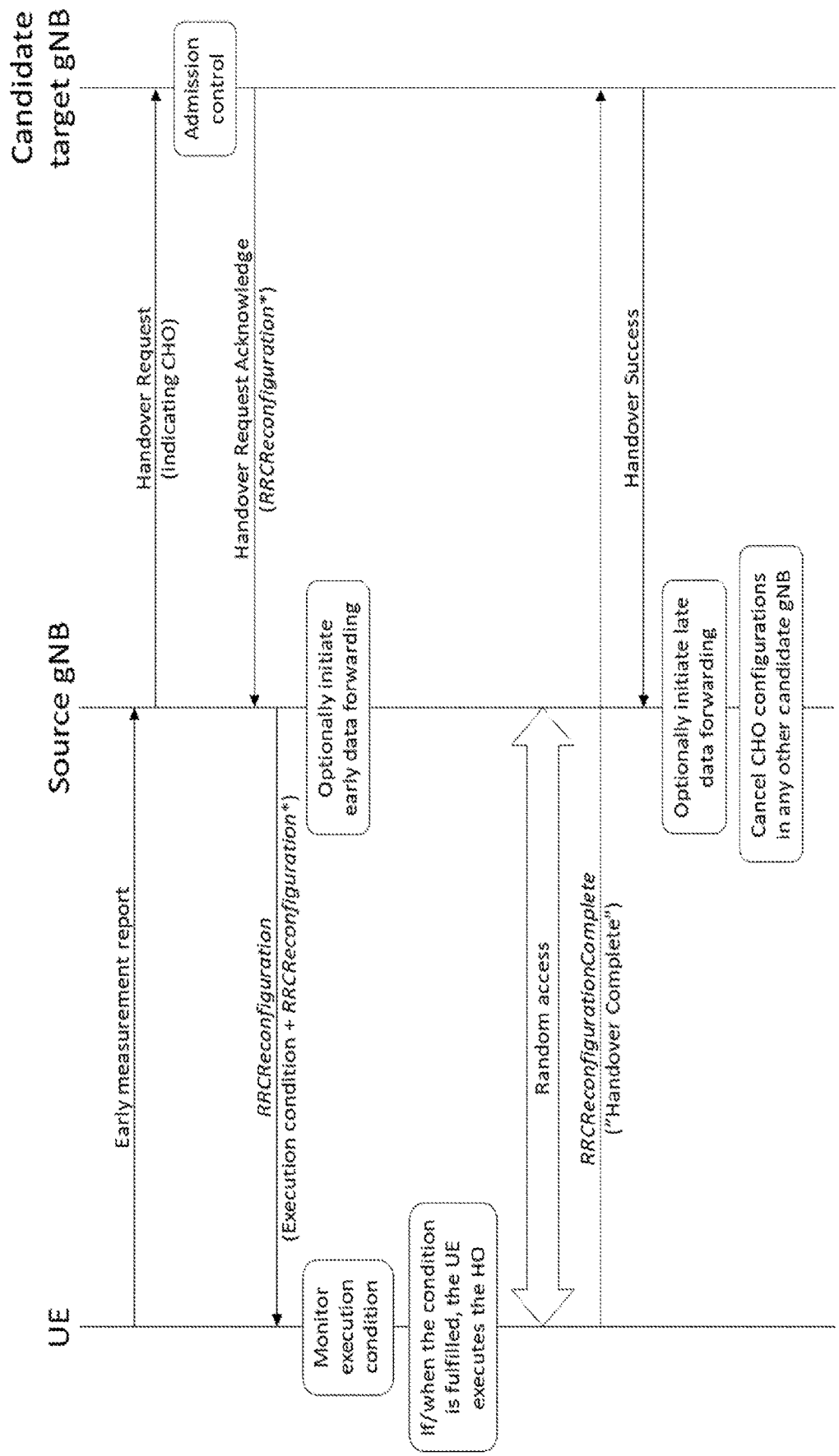
FIG. 3 shows a HO signalling according to prior art.
Figure 4:
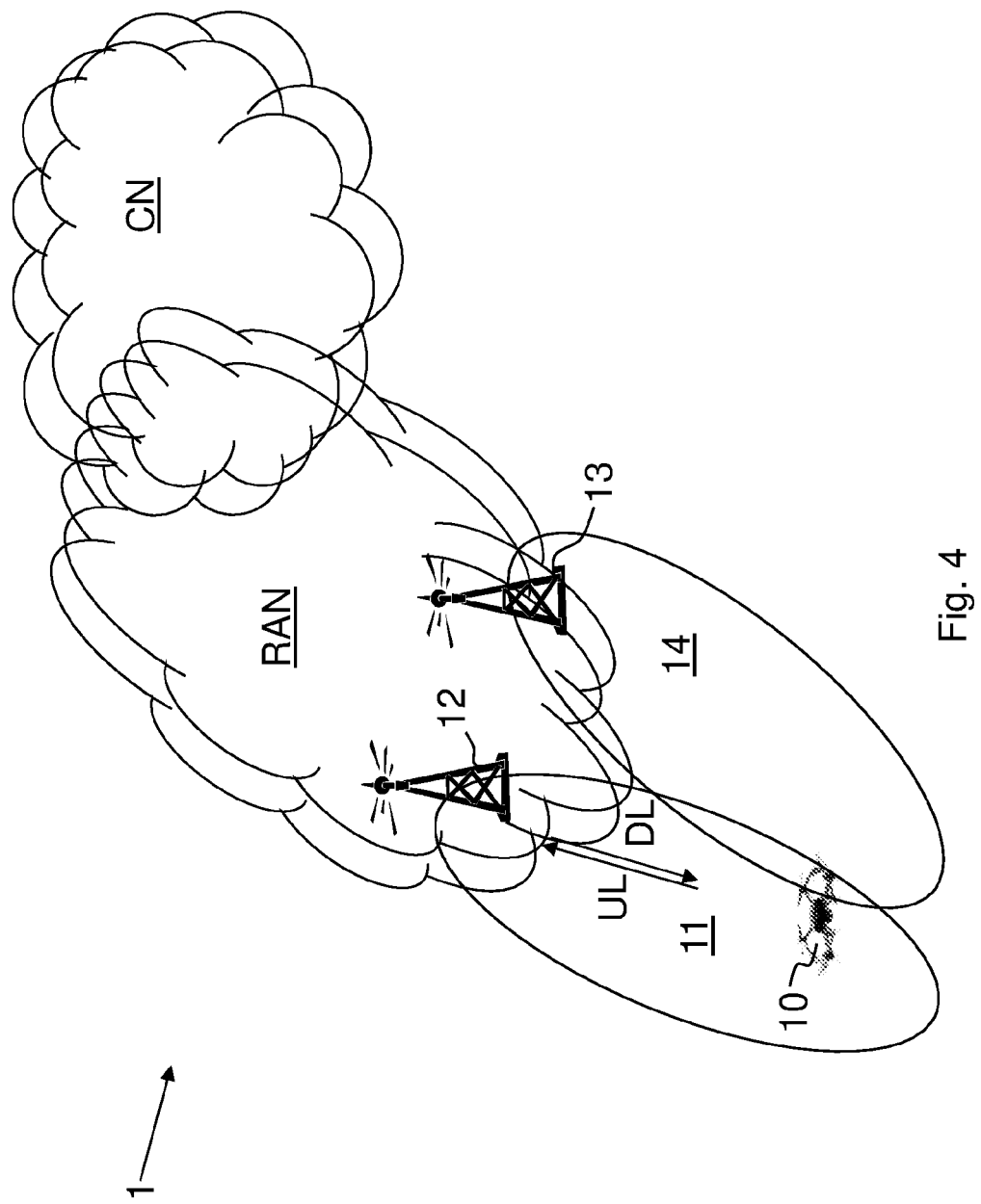
FIG. 4 shows an overview depicting a wireless communications network according to embodiments herein.

Embodiments herein relate to wireless communications networks in general. FIG. 4 is a schematic overview depicting a wireless communications network 1. The wireless communications network 1 comprises one or more RANs and one or more CNs. The wireless communications network 1 may use one or a number of different technologies. Embodiments herein are described within the context of LTE, i.e. E-UTRAN. It should be understood that the problems and solutions described herein are equally applicable to wireless access networks and user equipments (UEs) implementing other access technologies and standards. LTE is used as an example technology as it is suitable, and using LTE in the description therefore is particularly useful for understanding the problem and solutions solving the problem.

In the wireless communications network 1, a user equipment (UE) 10 exemplified herein as an aerial UE, a flight device, an unmanned aerial vehicle (UAV), a wireless device such as a mobile station, a non-access point (non-AP) station (STA), a STA and/or a wireless terminal, is comprised communicating via, e.g., one or more Access Networks (AN), e.g., radio access network (RAN), to one or more core networks (CN). It should be understood by the skilled in the art that "UE" is a non-limiting term which means any terminal, wireless communications terminal, user equipment, narrowband internet of things (NB-IoT) device, Machine Type Communication (MTC) device, Device to Device (D2D) terminal, or node e.g. smart phone, laptop, mobile phone, sensor, relay, mobile tablets or even a small base station capable of communicating using radio communication with a radio network node within an area served by the radio network node.

The wireless communications network 1 comprises a first radio network node 12 or just radio network node, providing radio coverage over a geographical area, a first service area 11 or first cell, of a first radio access technology (RAT), such as NR, LTE, or similar. The radio network node 12 may be a transmission and reception point such as an access node, an access controller, a base station, e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), a transmission arrangement of a radio base station, a stand-alone access point or any other network unit or node capable of communicating with a wireless device within the area served by the radio network node depending e.g. on the first radio access technology and terminology used. The radio network node may be referred to as a serving radio network node wherein the service area may be referred to as a serving cell, and the serving network node communicates with the wireless device in form of DL transmissions to the wireless device and UL transmissions from the wireless device. It should be noted that a service area may be denoted as cell, beam, beam group or similar to define an area of radio coverage.

The wireless communications network 1 comprises a second radio network node 13 providing radio coverage over a geographical area, a second service area 14 or second cell, of a second RAT, such as NR, LTE, or similar. The second radio network node 13 may be a transmission and reception point such as an access node, an access controller, a base station, e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), a transmission arrangement of a radio base station, a stand-alone access point or any other network unit or node capable of communicating with a wireless device within the area served by the second radio network node depending e.g. on the second radio access technology and terminology used. The second radio network node may be referred to as a target radio network node wherein the service area may be referred to as a target cell, and the target network node communicates with the wireless device in form of DL transmissions to the wireless device and UL transmissions from the wireless device. It should be noted that a service area may be denoted as cell, beam, beam group or similar to define an area of radio coverage.

According to embodiments herein the UE 10 determines whether the UE 10 is flying or not, and checks one or more conditions related to a handover or for handing over the UE, wherein the one or more conditions are based on whether the UE is determined to fly or not. For example, one condition may relate to an altitude of the UE 10, and/or a signal strength or quality of one or more cells. For example, the UE 10 may be configured with two different conditional HO configurations, a first CHO configuration for the UE 10 determined to fly and a second CHO configuration for the UE 10 determined not to fly. For example, the UE 10 may comprise a first time-to-trigger (TTT) value for the UE 10 determined to fly and a second TTT value for the UE 10 determined not to fly. Additionally or alternatively, the UE 10 may comprise a first event instance to trigger an action for the UE 10 determined to fly and a second event instance to trigger an action for the UE 10 determined not to fly. The UE 10 may be configured with a first threshold for the UE 10 determined to fly and a second threshold for the UE 10 determined not to fly. Thus, the UE 10 may be configured with different sets of radio related thresholds when evaluating a conditional handover. For example, a first set for a UE flying and a second set for a UE not flying.

Figure 5:
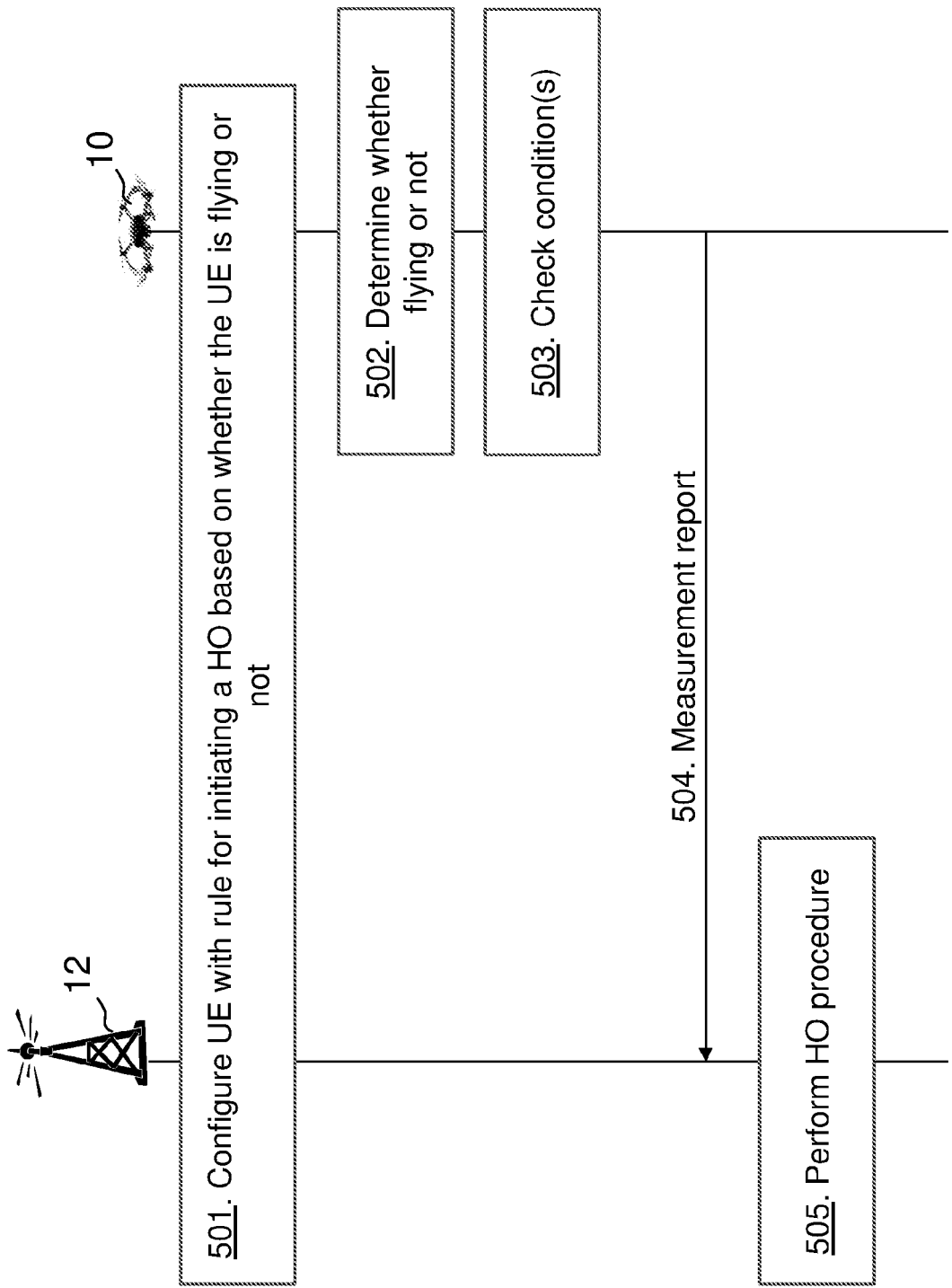
FIG. 5 shows a combined signalling scheme and flowchart depicting embodiments herein.

FIG. 5 is a combined signalling scheme and flowchart depicting embodiments herein.

Action 501. The radio network node 12 may configure the UE 10 to check one or more conditions for handover wherein the one or more conditions are based on whether the UE 10 is determined to fly or not.

Action 502. The UE 10 determines whether the UE 10 is airborne or not. That is, the UE 10 determines whether the UE 10 is flying or not. This may be performed using sensors indicating altitude and/or number of cells detected.

Determining that the UE 10 is flying may be based on: that measured signal strength or quality, such as RSRP, is above a threshold for more than N cells, also referred to as cell threshold; that height of the UE is above a threshold, also referred to as height threshold; values of internal sensors; and/or received commands.

Action 503. The UE 10 further checks the one or more conditions for handover wherein the one or more conditions are based on whether the UE 10 is determined to fly or not. The one or more condition may comprise two different conditional HO configurations, the first CHO configuration for the UE 10 determined to fly and the second CHO configuration for the UE 10 determined not to fly. The one or more conditions may comprise a condition with the first TTT value for the UE determined to fly and a condition with the second TTT value for the UE 10 determined not to fly. The one or more conditions may comprise a condition with the first event instance to trigger an action for the UE 10 determined to fly and a condition with the second event instance to trigger an action for the UE 10 determined not to fly. The one or more conditions may comprise a condition with a first threshold for the UE 10 determined to fly and a condition with a second threshold for the UE 10 determined not to fly. Thus, the UE 10 may be configured with different set of radio related thresholds when evaluating a conditional handover. The UE 10 may, for example, need to fly at a certain altitude in order to check an RSRP event like A3 for the cell. Alternatively or additionally, there may be more than two events per cell allowed. Alternatively or additionally, a height event may be specified as separate per UE event, which conditions certain CHO configurations to be checked.

Action 504. The UE 10 may upon fulfilment of the one or more conditions send a measurement report to the radio network node 12.

Action 505. The radio network node 12 may then handover the UE 10 to the target radio network node 13 or another cell, by, for example, performing a HO procedure.

Figure 6:
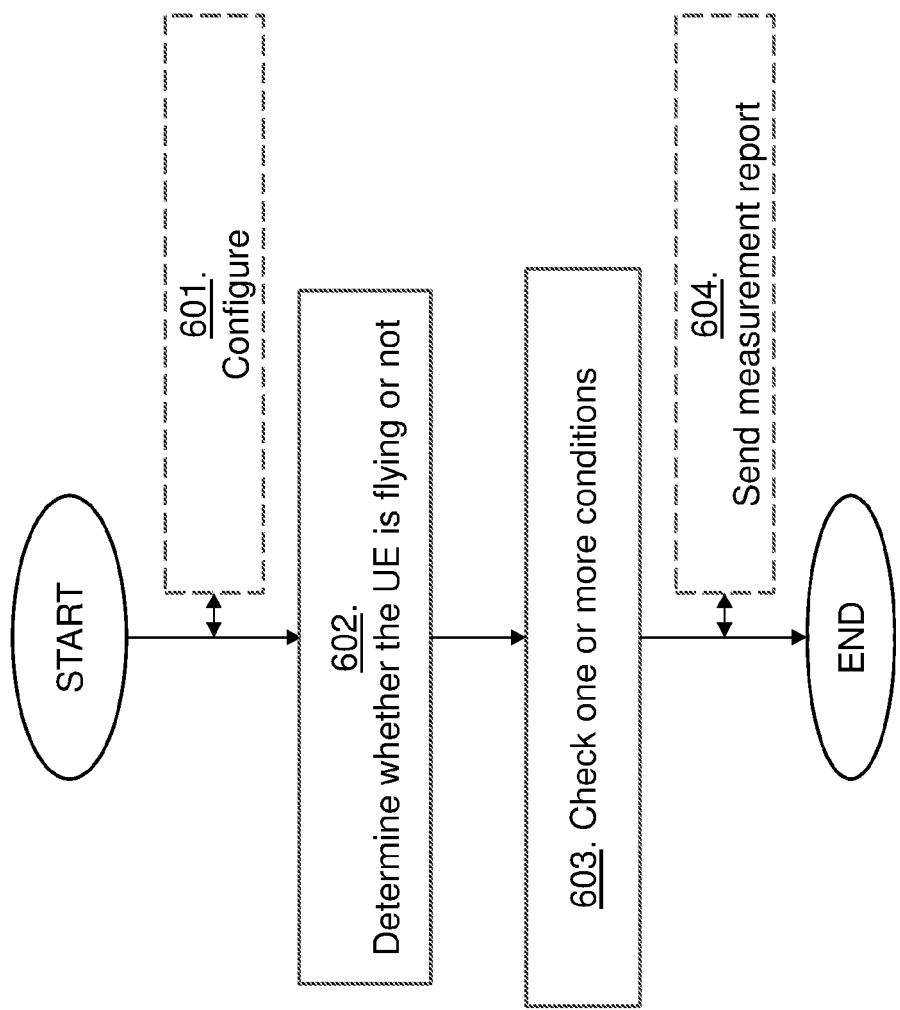
FIG. 6 shows a flowchart depicting a method performed by a UE according to embodiments herein.

The method actions performed by the UE 10 for handling communication in the wireless communications network according to embodiments will now be described with reference to a flowchart depicted in FIG. 6. The actions do not have to be taken in the order stated below but may be taken in any suitable order. Dashed boxes indicate optional features.

Action 601. The UE 10 may be configured by the radio network node 12 or preconfigured with the one or more conditions to handover the UE 10 to a cell and the one or more conditions are based on whether the UE 10 is determined to fly or not.

Action 602. The UE 10 determines whether the UE 10 is airborne or not. That is, the UE determines whether the UE 10 is flying or not.

How to determine whether the UE 10 is flying or not:

Some embodiments herein describe how the UE 10 is applying different behaviors when the UE 10 is flying compared to when the UE 10 is not flying. To determine whether the UE 10 is flying or not may be done in different ways.

First, UE sees many cells.

One approach the UE 10 may apply to determine if it is flying or not is that the UE 10 sees many cells, where "many" may be determined by that there are more than N cells. It may be considered that the UE 10 sees a cell if a radio related measurement, e.g., RSRP, is above a certain threshold, hence this embodiment may be implemented by that the UE considers itself as flying if RSRP is above a certain threshold for many cells or more than N cells, also referred to as a cell threshold. This may be implemented in the UE 10 so that the UE 10 is maintaining a list of cells which are fulfilling a certain radio condition, and if the size of this list becomes larger than N, then the UE 10 considers itself as flying.

The number of cells the UE 10 considers when applying this approach may be indicated to the UE 10, e.g., configured, by the radio network node 12.

This approach has the benefit that the UE 10 does not require devices to evaluate its height, e.g., does not require GPS. Instead, this approach relies on radio related measurements which the UE 10 anyway is capable of measuring.

Second, UE measured height is above a threshold.

One approach the UE 10 may apply to determine if it is flying or not is that the UE 10 measures its height. If the height is above a certain threshold, the UE 10 may consider itself as flying.

The UE 10 may monitor a particular event, e.g., H1-event, which is considered as fulfilled if the UE's height is above a certain threshold, and not fulfilled otherwise.

A height threshold that the UE 10 may apply in this approach may be indicated to the UE, e.g., configured, by the radio network node 12.

Third. UE uses internal sensors or monitor received commands.

One approach is that the UE 10 may use its own internal sensor to estimate whether it is flying or not. Internal sensors may include the gyroscope, barometer, or camera. Alternatively or additionally, the UE 10 may also figure out whether it is flying or not based on the commands received to the chipset used for the flying capabilities. Such commands may be, e.g., attention (AT) command, private protocol for mediatek (PMTK) command, or any other commands that the chipset used for flying is able to understand/decode.

Slight repetition of the flying definition: One option is that it is left to UE implementation to decide whether the UE 10 is in a flying state or not. Another option is that UE 10 is configured with a height threshold, and, above the height threshold, the UE 10 is determined to be flying and, below the height threshold, the UE 10 is determined to be not flying. This height threshold may be associated with an event definition similar to what is currently supported in LTE 36.331 v.16.0.0 H1/H2 where an event is associated with time-to-trigger and corresponding hysteresis, entry and leaving conditions. Yet another option is to associate the UE's flying status or state with the RSRP triggering based on a number of cells, also specified in LTE 36.331 v.16.0.0 and explained in the background section herein. Further, it may be a combination of the criteria mentioned above.

Action 603. The UE 10 further checks the one or more conditions related to a handover of the UE 10, wherein the one or more conditions are based on whether the UE 10 is determined to fly or not. The one or more conditions may comprise a first CHO configuration for the UE 10 determined to fly and a second CHO configuration for the UE 10 determined not to fly. Thus, the one or more conditions may comprise two different conditional HO configurations. The one or more conditions may comprise the condition with the first TTT value for the UE 10 determined to fly and the condition with the second TTT value for the UE 10 determined not to fly. The one or more conditions may comprise the condition with the first event instance to trigger an action for the UE 10 determined to fly and the condition with the second event instance to trigger an action for the UE 10 determined not to fly. The one or more conditions may comprise the condition with the first threshold for the UE 10 determined to fly and the condition with the second threshold for the UE 10 determined not to fly, thus, the UE 10 may be configured with different sets of radio related thresholds when evaluating a conditional handover.

The UE 10 may be configured or preconfigured to with the one or more conditions.

In some embodiments, determining that the UE 10 is flying is based on: that the measured signal strength or quality is above the threshold for more than N cells, that height of the UE 10 is above the threshold, the values of internal sensors, and/or the received commands.

Action 604. The UE 10 may upon fulfilment of one or more conditions send a measurement report to the radio network node 12.

Figure 7:
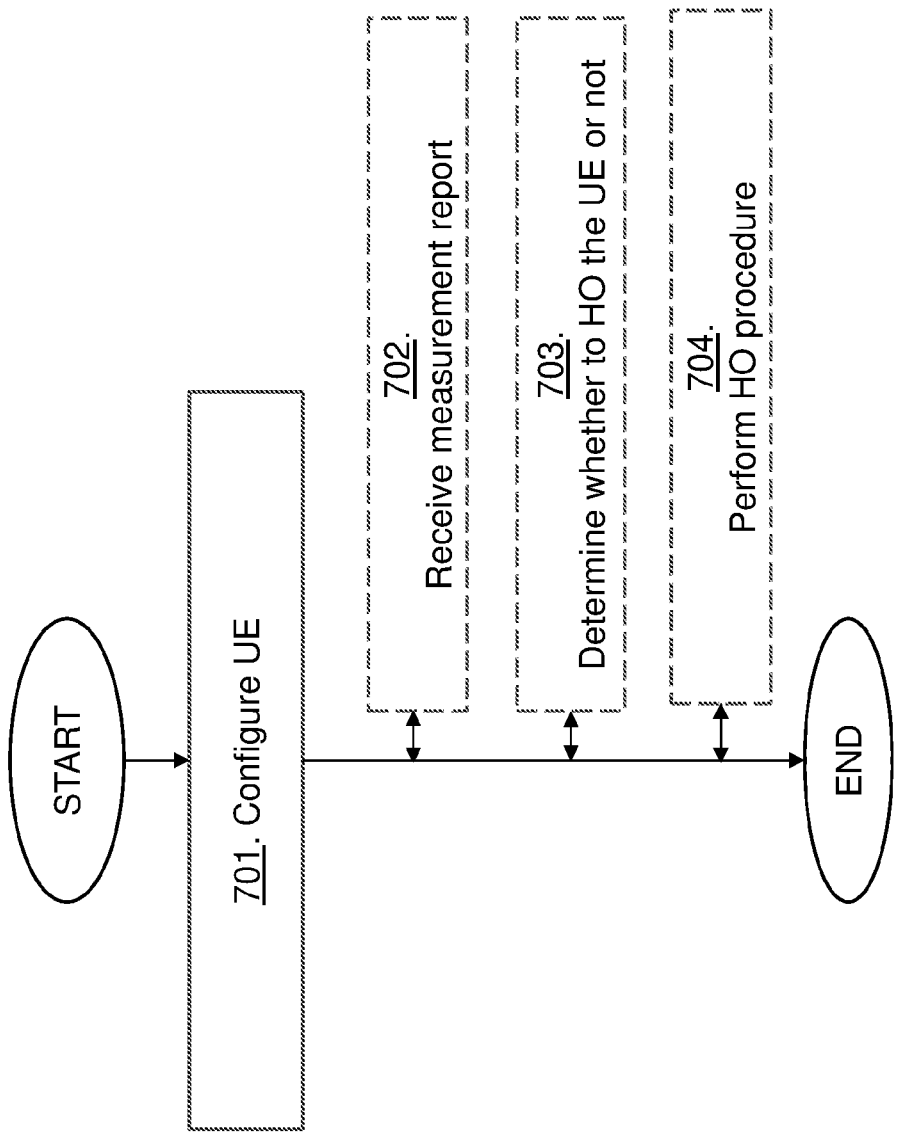
FIG. 7 shows a flowchart depicting a method performed by a radio network node according to embodiments herein.

The method actions performed by the radio network node 12 for handling communication in the wireless communications network 1 according to embodiments will now be described with reference to a flowchart depicted in FIG. 7. The actions do not have to be taken in the order stated below but may be taken in any suitable order. Dashed boxes indicate optional features.

Action 701. The radio network node 12 may configure the UE 10 with configuration data with the one or more conditions to handover the UE 10 to a cell and the one or more conditions are based on whether the UE 10 is determined to fly or not. The radio network node 12 may configure the UE 10 to determine whether the UE 10 is flying or not, and to check the one or more conditions related to a handover of the UE 10, wherein the one or more conditions are based on whether the UE 10 is determined to fly or not.

The one or more conditions may comprise the first CHO configuration for the UE 10 determined to fly and the second CHO configuration for the UE 10 determined not to fly.

The one or more conditions may comprise the condition with the first TTT value for the UE 10 determined to fly and another condition with the second TTT value for the UE 10 determined not to fly.

The one or more conditions may comprise the condition with the first event instance to trigger an action for the UE 10 determined to fly and the condition with the second event instance to trigger an action for the UE 10 determined not to fly.

The one or more conditions may comprise the condition with the first threshold for the UE 10 determined to fly and the condition with the second threshold for the UE 10 determined not to fly.

Action 702. The radio network node 12 may receive the measurement report from the UE 10 when the UE 10 is determined to fly, and the one or more conditions are fulfilled.

Action 703. The radio network node 12 may then determine whether to HO the UE 10 or not, taking the measurement report into account.

Action 704. The radio network node 12 may handover the UE 10 to a target radio network, e.g., the target radio network node 13, or another cell, by, for example, performing a HO procedure.

Thus, embodiments herein disclose a flight dependent CHO triggering.

The UE 10, when determining whether to execute a particular conditional handover towards a cell, in addition determines whether the UE 10 is flying or not, i.e., that that UE 10 is airborne or not. For example, the UE 10 may only execute the conditional handover to a cell X if the UE 10 is flying, but not otherwise.

Whether the UE 10 is flying can be determined by several different means.

It should be noted that when the UE 10 is on the ground, the UE 10 may see one set of cells, e.g., those cells which are hosted by radio network nodes physically near to the UE 10, and hence only these cells are interesting to perform a handover to. However, when the UE 10 is flying, the UE 10 may be served by back/side lobes of radio network nodes and what is the best cell for the UE 10 may be a cell which is hosted by a radio network node far away. So, it should be noted that the set of cells which are interesting to do a handover to are different if the UE 10 is flying compared to if the UE 10 is not flying.

Early evaluation: One way in which the above embodiment can be implemented is that the UE 10 will evaluate whether the conditional handover should be executed or not regardless of the fly/not-fly condition, but the UE 10 will not act on this evaluation, i.e., not execute the conditional handover, unless the fly/not-fly condition also is fulfilled. This basically means that the fly/not-fly condition may be the ultimate pre-requisite to be fulfilled before executing the conditional handover procedure. In addition, the UE 10 may be configured with two different conditional HO configurations. One of those applying when the UE 10 is flying and another applying when the UE 10 is not flying. According to this embodiment, the UE 10 will evaluate in parallel both configured CHO conditions and only execute the one that triggers and also fulfills the flying condition.

Example: if the UE 10 is configured to execute a conditional handover to cell X if cell X is 3 dB RSRP better than the current cell Y, but only if the UE 10 is also flying. Then the UE 10 may, according to this approach, evaluate whether cell X is 3 dB better than cell Y, and that criterion, i.e., the RSRP criterion or event, may become fulfilled. But the UE 10 will not act on this unless the UE 10 is also flying. If the UE 10 happens to not be flying when this happens, the UE 10 will not execute the conditional handover, or it may execute conditional HO with a criterion configured which is specified to be applied in a non-flying state. E.g., it may be same cell X but threshold set as 2 dB. However, if the UE 10 later starts flying, the UE 10 would in response to this execute the conditional handover, assuming that the RSRP criterion is also fulfilled. Note that these conditional HO events may also be associated with different TTT values, e.g., such that a TTT is shorter if the UE 10 is flying and longer if the UE 10 is not flying.

Delayed evaluation: Another way in which this may be implemented is that the UE 10 does not start evaluating a conditional handover unless the fly/not-fly condition is also fulfilled. For example, the UE 10 may not start a TTT timer for a conditional handover that shall only apply when the UE 10 is flying, if the UE 10 is not flying at that point in time. If the fly/not-fly condition later becomes also fulfilled, so that both conditions are fulfilled, the UE 10 may at that point in time execute the conditional handover. This basically means that the fly/not-fly condition is the first pre-requisite to be fulfilled before starting to evaluate the fulfillment of the event configured for the conditional handover.

Example: if the UE 10 is configured to execute a conditional handover to cell X if cell X is 3 dB RSRP better than the current cell Y, but only if the UE 10 is also flying. Then the UE 10 may, according to this approach, not evaluate whether cell X is 3 dB better than cell Y, meaning that that criterion, i.e., the RSRP criterion, may not become fulfilled, unless the UE 10 is also flying. The UE 10 will instead only start to evaluate the RSRP criterion if or when the UE 10 later starts to fly.

Flight Dependent TTT.

In one embodiment, the UE 10 may apply the first TTT value if the UE 10 is flying and another TTT if the UE 10 is not flying. For example, if the UE 10 is flying the UE 10 applies a TTT1 but if the UE 10 is not flying the UE applies a TTT2, where TTT1 with benefit is shorter than TTT2, since, when flying, the cell size that the UE 10 perceives may be smaller.

The two or more TTTs that the UE 10 applies may be implemented by different event instances, or different triggers, one which is applicable when the UE 10 is flying and another otherwise. These two or more event instances, or triggers, may be configured to consider different TTTs. If the UE 10 is flying, the first event instance is applicable which has TTT, but, if the UE 10 is not flying, the second event instance is applicable which has another TTT. Alternatively, the different TTTs may be also implemented in the existing measurements events that are used to trigger the execution of the conditional handover. This latter approach will reduce the signaling overhead as there will be no need to duplicate the same events twice, one for each TTT, for flying and not flying UEs, but one event is configured.

Note that the difference from embodiments above is that here the event, or even only the TTT, is extracted to be different, while above the whole CHO configuration may be different.

Flight Dependent Radio Thresholds.

If the UE 10 is flying, the UE 10 may apply a different set of radio related thresholds when evaluating a conditional handover, compared to when the UE 10 is not flying.

For example, if the UE 10 is not flying, the UE 10 may be applying an RSRP threshold of 3 dB when evaluating a conditional handover, but if the UE 10 is flying, the UE 10 applies an RSRP threshold of 2 dB which will result in that the UE 10 performs a conditional handover more easily when the UE 10 is flying compared to when the UE 10 is not.

The two or more sets of thresholds that the UE 10 applies may be implemented by different event instances, or different triggers, one which is applicable when the UE 10 is flying and one otherwise. These two or more event instances, or triggers, may be configured to consider different sets of thresholds. If the UE 10 is flying, the first event instance is applicable which has one set of thresholds, but if the UE 10 is not flying, the second event instance is applicable which has another set of thresholds.

Another approach is that the UE 10 applies one event instance (or one trigger), but the threshold used by this single event instance (or this one trigger) is different dependent on the height.

Note that the difference from embodiments above is that here the event, or even only the RSRP condition, is extracted to be different, while above the whole CHO configuration may be different.

Signalling Options.

It is described herein how the UE 10 is configured with different configurations, values, time durations, etc. These may be configured explicitly for the UE 10 using dedicated signalling. Another approach is that it is configured for the UE 10 using broadcast signalling. Exemplified below in bold text.

The UE shall:
1> for each condReconfigId within the VarConditionalReconfig:
  2> consider the cell which has a physical cell identity matching the value indicated in the ServingCellConfigCommon included in the reconfigurationWithSync in the received condRRCReconfig to be applicable cell;
  2> for each measId included in the measIdList within VarMeasConfig indicated in the condExecutionCond associated to condReconfigId:
    3> if the entry condition(s) applicable for this event associated with the condReconfigId, i.e. the event corresponding with the condEventId(s) of the corresponding condTriggerConfig within VarConditionalReconfig, is fulfilled for the applicable cells for all measurements after layer 3 filtering taken during the corresponding timeToTrigger defined for this event within the VarConditionalReconfig:
      4> consider the event associated to that measId to be fulfilled;
    3> if the leaving condition(s) applicable for this event associated with the condReconfigId, i.e. the event corresponding with the condEventId(s) of the corresponding condTriggerConfig within VarConditionalReconfig, is fulfilled for the applicable cells for all measurements after layer 3 filtering taken during the corresponding timeToTrigger defined for this event within the VarConditionalReconfig:
      4> consider the event associated to that measId to be not fulfilled;
    3> if the entry condition(s) applicable for this event associated with the condReconfigId and CondTriggerConfig is set to condEventH1 and this event is not fulfilled, consider the event associated to that measID not fulfilled
  2> if event(s) associated to all measId(s) within condTriggerConfig for a target candidate cell within the stored condRRCReconfig are fulfilled:
    3> consider the target candidate cell within the stored condRRCReconfig, associated to that condReconfigId, as a triggered cell;
    3> initiate the conditional reconfiguration execution, as specified in 5.3.5.13.5;

NOTE: Up to 2 MeasId can be configured for each condReconfigId. The conditional reconfiguration event of the 2 MeasId may have the same or different event conditions, triggering quantity, time to trigger, and triggering threshold.

Configuration of Two Events at the Same Time:

5.3.5.13.4 Conditional Reconfiguration Evaluation

The UE shall:
1> for each condReconfigId within the VarConditionalReconfig:
  2> consider the cell which has a physical cell identity matching the value indicated in the ServingCellConfigCommon included in the reconfigurationWithSync in the received condRRCReconfig to be applicable cell;
  2> for each measId included in the measIdList within VarMeasConfig indicated in the condExecutionCond associated to condReconfigId:
    3> if the event corresponding with the condEventIdDrone of the corresponding condTriggerConfig within VarConditionalReconfig is set to condEventH1 and, if the entry condition(s) applicable for this event associated with the condReconfigId is not fulfilled:
      4> consider the event associated to that measId to be not fulfilled;
    3> else if if the event corresponding with the condEventIdDrone of the corresponding condTriggerConfig within VarConditionalReconfig is set to condEventH1 and, if the entry condition(s) applicable for this event associated with the condReconfigId is fulfilled:
      4> if the entry condition(s) applicable for this event associated with the condReconfigId, i.e. the event corresponding with the condEventId(s) of the corresponding condTriggerConfig within VarConditionalReconfig, is fulfilled for the applicable cells for all measurements after layer 3 filtering taken during the corresponding timeToTrigger defined for this event within the VarConditionalReconfig:
        5> consider the event associated to that measId to be fulfilled;
      4> if the leaving condition(s) applicable for this event associated with the condReconfigId, i.e. the event corresponding with the condEventId(s) of the corresponding condTriggerConfig within VarConditionalReconfig, is fulfilled for the applicable cells for all measurements after layer 3 filtering taken during the corresponding timeToTrigger defined for this event within the VarConditionalReconfig:
        5> consider the event associated to that measId to be not fulfilled;
  2> if event(s) associated to all measId(s) within condTriggerConfig for a target candidate cell within the stored condRRCReconfig are fulfilled:

3> consider the target candidate cell within the stored condRRCReconfig, associated to that condReconfigId, as a triggered cell;
3> initiate the conditional reconfiguration execution, as specified in 5.3.5.13.5;

```
CondTriggerConfig-r16 ::=      SEQUENCE {
  condEventId                    CHOICE {
    condEventA3                    SEQUENCE {
      a3-Offset                      MeasTriggerQuantityOffset,
      hysteresis                     Hysteresis,
      timeToTrigger                  TimeToTrigger
    },
    condEventA5                    SEQUENCE {
      a5-Threshold1                  MeasTriggerQuantity,
      a5-Threshold2                  MeasTriggerQuantity,
      hysteresis                     Hysteresis,
      timeToTrigger                  TimeToTrigger
    },
    ...
  },
  rsType-r16                     NR-RS-Type,
  ...,
  [[
  condEventIdDrone-r17           CHOICE {
    condEventH1                    SEQUENCE {
      H1-ThresholdOffset             INTEGER (0..300),
      H1-hysteresis                  Hysteresis,
      timeToTrigger                  TimeToTrigger
    },
  ]]
}
```

Configuration with additional H1 event in addition to the existing ones.

5.3.5.13.4 Conditional Reconfiguration Evaluation

The UE shall:

1> for each condReconfigId within the VarConditionalReconfig:

2> consider the cell which has a physical cell identity matching the value indicated in the ServingCellConfigCommon included in the reconfigurationWithSync in the received condRRCReconfig to be applicable cell;

2> for each measId included in the measIdList within VarMeasConfig indicated in the condExecutionCond associated to condReconfigId:

3> if the event associated with the condReconfigId, i.e. the event corresponding with the condEventId(s) of the corresponding condTriggerConfig within VarConditionalReconfig, is set to condEventH1 and the entry condition(s) applicable for this event is not fulfilled:

4> consider the event associated to that measId to be not fulfilled;

3> else:

4> if the entry condition(s) applicable for this event associated with the condReconfigId, i.e. the event corresponding with the condEventId(s) of the corresponding condTriggerConfig within VarConditionalReconfig, is fulfilled for the applicable cells for all measurements after layer 3 filtering taken during the corresponding timeToTrigger defined for this event within the VarConditionalReconfig:

5> consider the event associated to that measId to be fulfilled;

4> if the leaving condition(s) applicable for this event associated with the condReconfigId, i.e. the event corresponding with the condEventId (s) of the corresponding condTriggerConfig within VarConditionalReconfig, is fulfilled for the applicable cells for all measurements after layer 3 filtering taken during the corresponding timeToTrigger defined for this event within the VarConditionalReconfig:

5> consider the event associated to that measId to be not fulfilled;

2> if event(s) associated to all measId(s) within condTriggerConfig for a target candidate cell within the stored condRRCReconfig are fulfilled:

3> consider the target candidate cell within the stored condRRCReconfig, associated to that condReconfigId, as a triggered cell;

3> initiate the conditional reconfiguration execution, as specified in 5.3.5.13.5;

```
CondTriggerConfig-r16 ::=      SEQUENCE {
  condEventId                    CHOICE {
    condEventA3                    SEQUENCE {
      a3-Offset                      MeasTriggerQuantityOffset,
      hysteresis                     Hysteresis,
      timeToTrigger                  TimeToTrigger
    },
    condEventA5                    SEQUENCE {
      a5-Threshold1                  MeasTriggerQuantity,
      a5-Threshold2                  MeasTriggerQuantity,
      hysteresis                     Hysteresis,
      timeToTrigger                  TimeToTrigger
    },
    ...,
    [[
    condEventIdDrone-r17           CHOICE {
      condEventH1                    SEQUENCE {
        H1-ThresholdOffset             INTEGER (0..300),
        H1-hysteresis                  Hysteresis,
        timeToTrigger                  TimeToTrigger
      },
    ]]
  },
  rsType-r16                     NR-RS-Type,
  ...
}
```

Figure 8B:
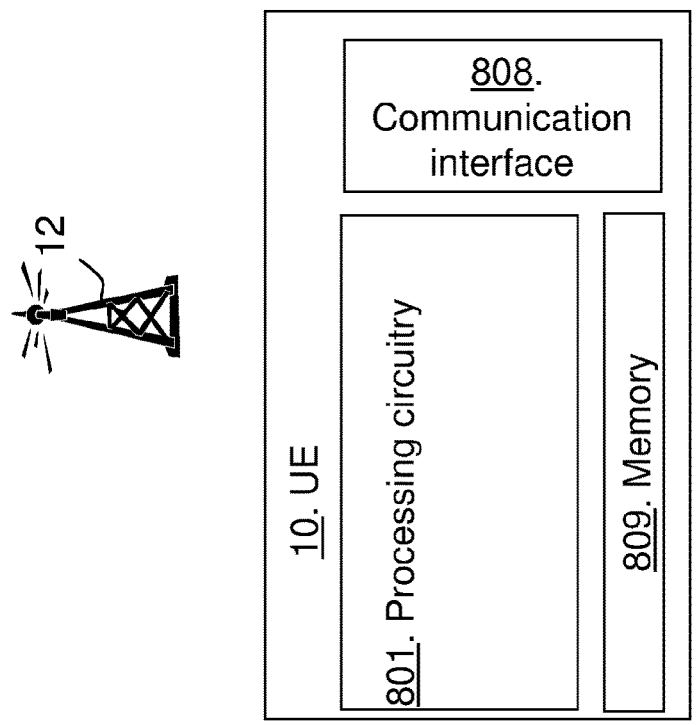
FIGS. 8a-8b shows a block diagram depicting embodiments of a UE according to embodiments herein.
Figure 8A:
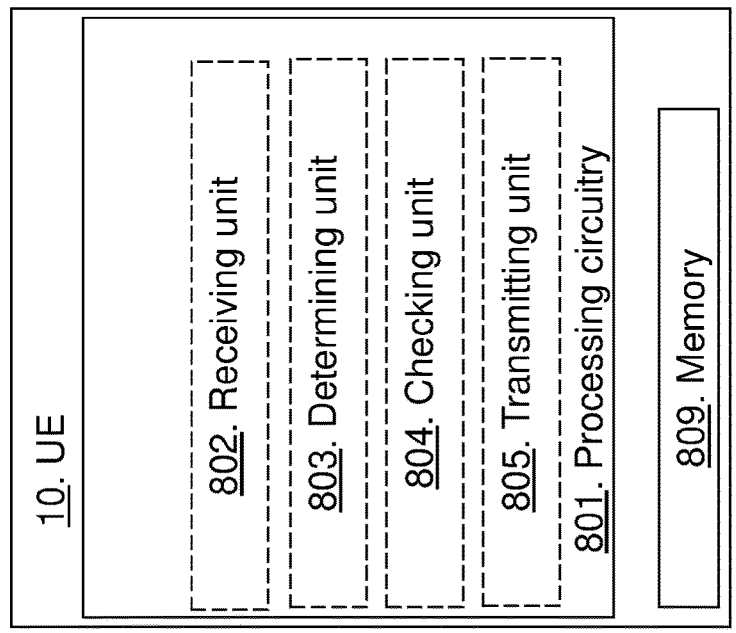
Figure 8A:
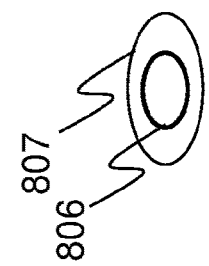

FIGS. 8a and 8b are block diagrams depicting the UE 10 in two embodiments for handling communication in the wireless communications network 1 according to embodiments herein.

The UE 10 may comprise processing circuitry 801, e.g., one or more processors, configured to perform the methods herein.

The UE 10 may comprise a receiving unit 802, e.g., a receiver or transceiver. The UE 10, the processing circuitry 801 and/or the receiving unit 802 may be configured to receive configuration data from the radio network node 12 or be preconfigured for handling handover of the UE 10 based on one or more rules. Thus, the UE 10 may be configured by the radio network node 12 or be preconfigured with the one or more conditions to handover the UE to a cell based on whether the UE 10 is determined to fly or not.

The UE 10 may comprise a determining unit 803. The UE 10, the processing circuitry 801 and/or the determining unit 803 are configured to determine whether the UE 10 is airborne or not, i.e., whether the UE 10 is flying or not. The UE 10, the processing circuitry 801 and/or the determining unit 803 may be configured to determine that the UE 10 is flying when the UE registers/sees/detects more than N cells, i.e., more than N cells are above a certain threshold (a cell threshold). Additionally or alternatively, the UE 10, the processing circuitry 801 and/or the determining unit 803 may be configured to determine that the UE 10 is flying when a measured height is above the height threshold. The UE 10, the processing circuitry 801 and/or the determining unit 803 may be configured to determine that the UE 10 is flying by using internal sensors or monitoring received commands. The UE 10, the processing circuitry 801 and/or the determining unit 803 may be configured to determine that the UE 10 is flying based on: that measured signal strength or quality is above the threshold for more than N cells, that height of the UE is above the threshold, values of internal sensors, and/or received commands.

The UE 10 may comprise a checking unit 804. The UE 10, the processing circuitry 801 and/or the checking unit 804 is configured to check the one or more conditions related to a handover of the UE 10, wherein the one or more conditions are based on whether the UE 10 is determined to fly or not. The one or more conditions may comprise two different conditional HO configurations. The one or more conditions may comprise the first CHO configuration for the UE 10 determined to fly and the second CHO configuration for the UE 10 determined not to fly. The one or more conditions may comprise a condition with the first TTT value for the UE 10 determined to fly and a condition with the second TTT value for the UE 10 determined not to fly. The one or more conditions may comprise a condition with the first event instance to trigger an action for the UE 10 determined to fly and a condition with the second event instance to trigger an action for the UE 10 determined not to fly. The one or more conditions may comprise a condition with the first threshold for the UE 10 determined to fly and a condition with the second threshold for the UE 10 determined not to fly. Thus, the UE 10 may be configured with different sets of radio related thresholds when evaluating a conditional handover.

The UE 10 may comprise a transmitting unit 805, e.g., a transmitter or a transceiver. The UE 10, the processing circuitry 801, and/or the transmitting unit 805 may be configured to send the measurement report to the radio network node 12 upon fulfilment of the one or more conditions.

The UE 10 may comprise a memory 809. The memory 809 comprises one or more units to be used to store data on, such as data packets, thresholds, signal strengths and/or qualities, measurements, configurations, flying detection parameters, RA procedures, events and applications to perform the methods disclosed herein when being executed, and similar. Furthermore, the UE may comprise a communication interface 808 such as comprising a transmitter, a receiver, a transceiver, and/or one or more antennas.

The methods according to the embodiments described herein for the UE 10 are respectively implemented by means of, e.g., a computer program product 806 or a computer program, comprising instructions, i.e., software code portions, which, when executed on at least one processor, cause the at least one processor to carry out the actions described herein, as performed by the UE 10. The computer program product 806 may be stored on a computer-readable storage medium 807, e.g., a disc, a universal serial bus (USB) stick or similar. The computer-readable storage medium 807, having stored thereon the computer program product, may comprise the instructions which, when executed on at least one processor, cause the at least one processor to carry out the actions described herein, as performed by the UE 10. In some embodiments, the computer-readable storage medium may be a transitory or a non-transitory computer-readable storage medium. Thus, embodiments herein may disclose a UE 10 for handling communication in a wireless communications network, wherein the UE 10 comprises processing circuitry and a memory, said memory comprising instructions executable by said processing circuitry whereby said UE 10 is operative to perform any of the methods herein.

Figure 9B:
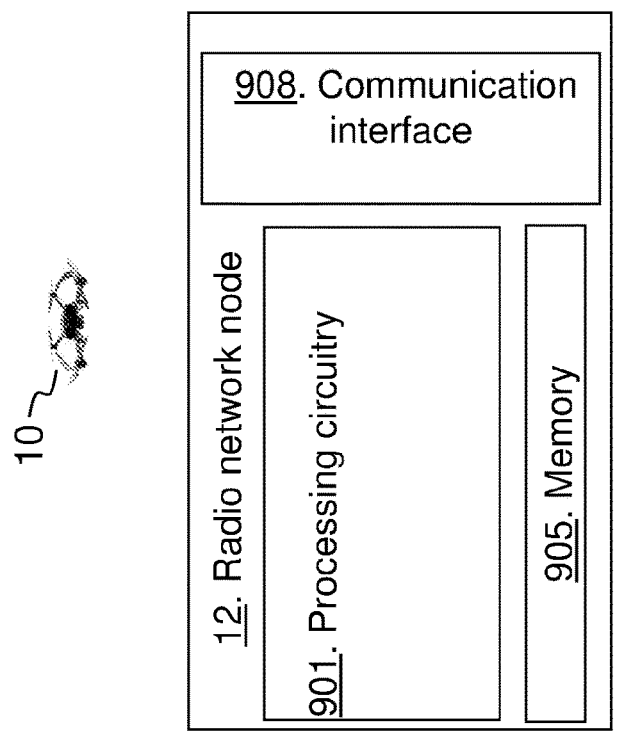
FIGS. 9a-9b shows a block diagram depicting embodiments of a radio network node according to embodiments herein.
Figure 9A:
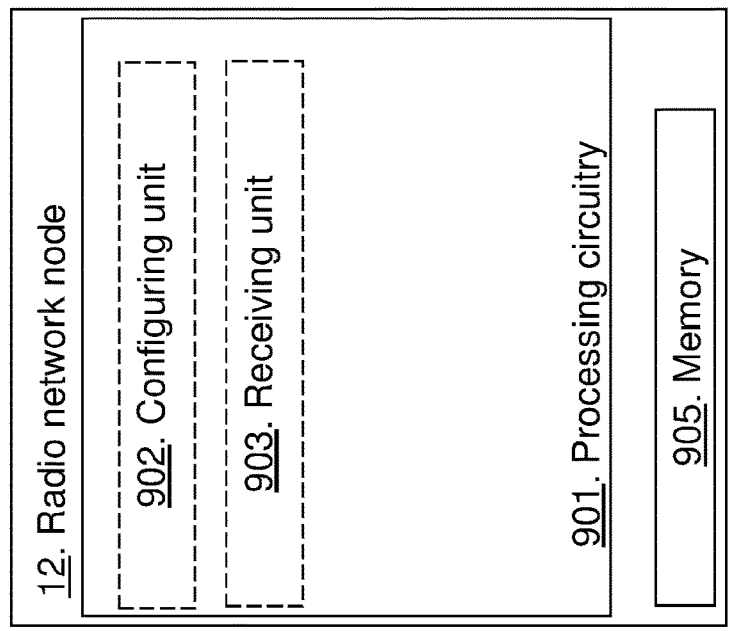
Figure 9A:
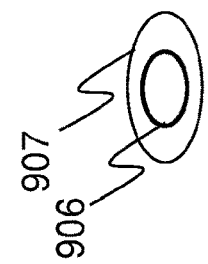

FIGS. 9*a* and 9*b* are block diagrams depicting the radio network node 12 in two embodiments for handling communication in the wireless communications network 1 according to embodiments herein.

The radio network node 12 may comprise processing circuitry 901, e.g., one or more processors, configured to perform the methods herein.

The radio network node 12 may comprise a configuring unit 902, e.g., a transmitter or a transceiver. The radio network node 12, the processing circuitry 901 and/or the configuring unit 902 are configured to configure the UE 10 with the one or more conditions to handover the UE to a cell and wherein the one or more conditions are based on whether the UE 10 is determined to fly or not. The radio network node 12, the processing circuitry 901 and/or the configuring unit 902 are configured to configure the UE 10 to determine whether the UE 10 is flying or not, and to check the one or more conditions related to a handover of the UE 10, wherein the one or more conditions are based on whether the UE 10 is determined to fly or not.

The one or more conditions may comprise the first CHO configuration for the UE determined to fly and the second CHO configuration for the UE determined not to fly.

The one or more conditions may comprise the condition with the first TTT value for the UE determined to fly and another condition with the second TTT value for the UE determined not to fly.

The one or more conditions may comprise the condition with the first event instance to trigger an action for the UE determined to fly and the condition with the second event instance to trigger an action for the UE determined not to fly.

The one or more conditions may comprise the condition with the first threshold for the UE determined to fly and the condition with the second threshold for the UE determined not to fly.

The radio network node 12, the processing circuitry 901 and/or the configuring unit 902 may be configured to configure the UE 10 with parameters, thresholds and/or the like to determine when to transmit measurement reports. E.g., the radio network node 12, the processing circuitry 901 and/or the configuring unit 902 may be configured to configure the UE 10 with thresholds of altitude, number of detected cells, signal strength or quality, and/or parameters for configuration.

The radio network node 12 may comprise a receiving unit 903, e.g., a receiver or a transceiver. The radio network node 12, the processing circuitry 901 and/or the receiving unit 903 may be configured to receive the measurement report form the UE 10 when the UE 10 is determined to fly, and the one or more conditions are fulfilled, and the radio network node may then be configured to then perform a handover procedure of the UE 10 based on the received measurement report. The radio network node 12, and/or the processing circuitry 901 may handover the UE 10 to a target radio network, e.g., the target radio network node 13, or another cell, by, for example, performing a HO procedure.

The radio network node 12 may comprise a memory 905. The memory 905 comprises one or more units to be used to store data on, such as data packets, CHO configurations, allocated resources, thresholds, events and applications to perform the methods disclosed herein when being executed, and similar. Furthermore, the radio network node 12 may comprise a communication interface 908 such as comprising a transmitter, a receiver, a transceiver and/or one or more antennas.

The methods according to the embodiments described herein for the radio network node 12 are respectively implemented by means of, e.g., a computer program product 906 or a computer program, comprising instructions, i.e., software code portions, which, when executed on at least one processor, cause the at least one processor to carry out the actions described herein, as performed by the radio network node 12. The computer program product 906 may be stored on a computer-readable storage medium 907, e.g., a disc, a USB stick or similar. The computer-readable storage medium 907, having stored thereon the computer program product, may comprise the instructions which, when executed on at least one processor, cause the at least one processor to carry out the actions described herein, as performed by the radio network node 12. In some embodiments, the computer-readable storage medium may be a transitory or a non-transitory computer-readable storage medium. Thus, embodiments herein may disclose a radio network node 12 for handling communication in a wireless communications network, wherein the radio network node 12 comprises processing circuitry and a memory, said memory comprising instructions executable by said processing circuitry whereby said radio network node 12 is operative to perform any of the methods herein.

In some embodiments, a more general term "radio network node" is used and it can correspond to any type of radio-network node or any network node, which communicates with a wireless device and/or with another network node. Examples of network nodes are NodeB, MeNB, SeNB, a network node belonging to Master cell group (MCG) or Secondary cell group (SCG), base station (BS), multi-standard radio (MSR) radio node such as MSR BS, eNodeB, gNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), etc.

In some embodiments, the non-limiting term wireless device or user equipment (UE) is used and it refers to any type of wireless device communicating with a network node and/or with another wireless device in a cellular or mobile communication system. Examples of UE are target device, device to device (D2D) UE, proximity capable UE (aka ProSe UE), machine type UE or UE capable of machine to machine (M2M) communication, Tablet, mobile terminals, smart phone, laptop embedded equipped (LEE), laptop mounted equipment (LME), USB dongles etc.

Embodiments are applicable to any RAT or multi-RAT systems, where the wireless device receives and/or transmit signals (e.g. data) e.g. New Radio (NR), Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

As will be readily understood by those familiar with communications design, that functions means or circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware and/or program or application data. Other hardware, conventional and/or custom, may also be included. Designers of communications devices will appreciate the cost, performance, and maintenance trade-offs inherent in these design choices.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 10:
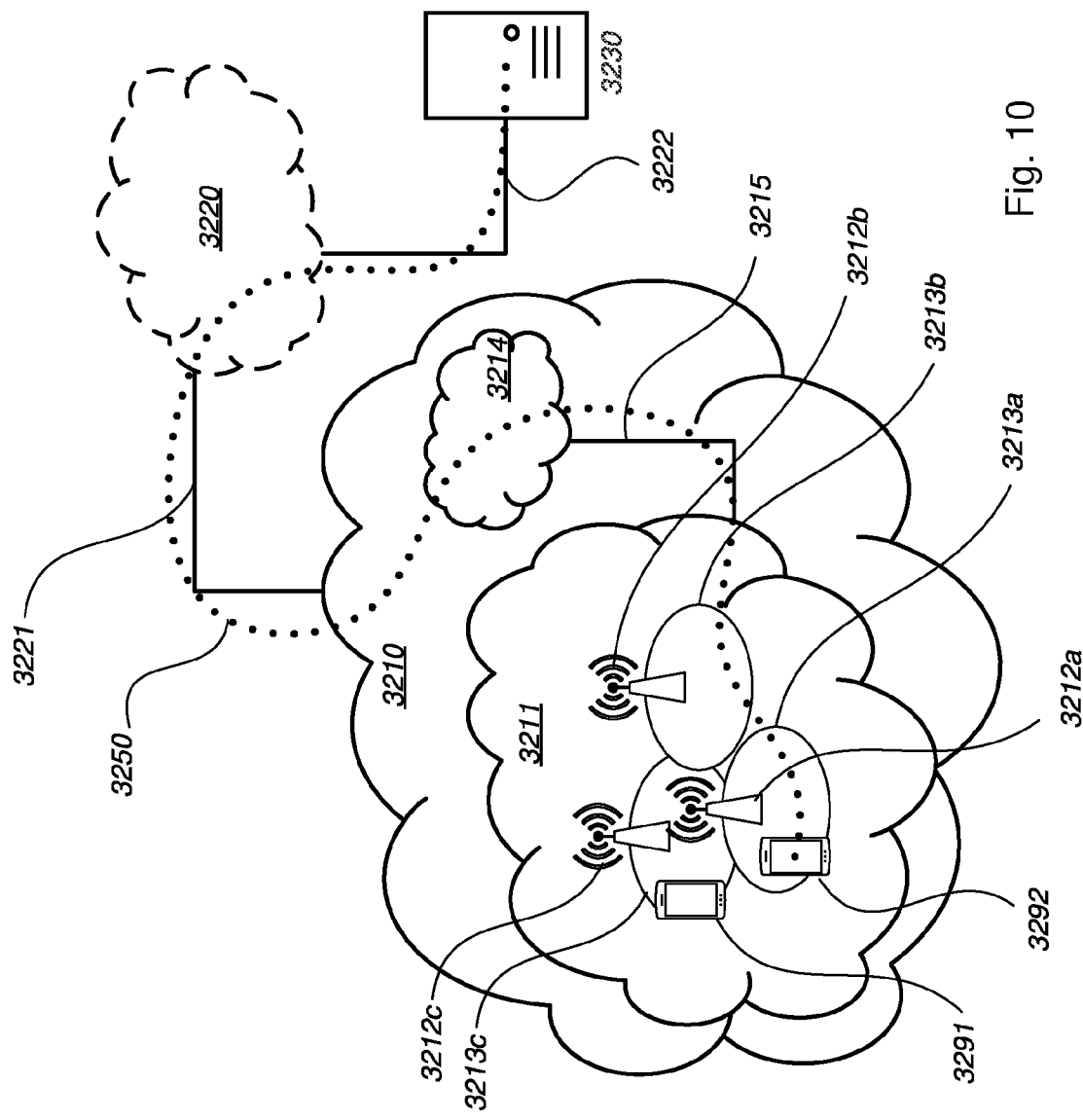
FIG. 10 schematically illustrates a telecommunication network connected via an intermediate network to a host computer.

With reference to FIG. 10, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points being examples of the radio network node 12 herein, each defining a corresponding coverage area 3213a, 3213b, 3213c. Each base station 3212a, 3212b, 3212c is connectable to the core network 3214 over a wired or wireless connection 3215. A first user equipment (UE) 3291, being an example of the UE 10, located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 10 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 11. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 11) served by the base station 3320. The communication interface 3326 may be configured to facilitate a connection 3360 to the host computer 3310. The connection 3360 may be direct or it may pass through a core network (not shown in FIG. 11) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 11:
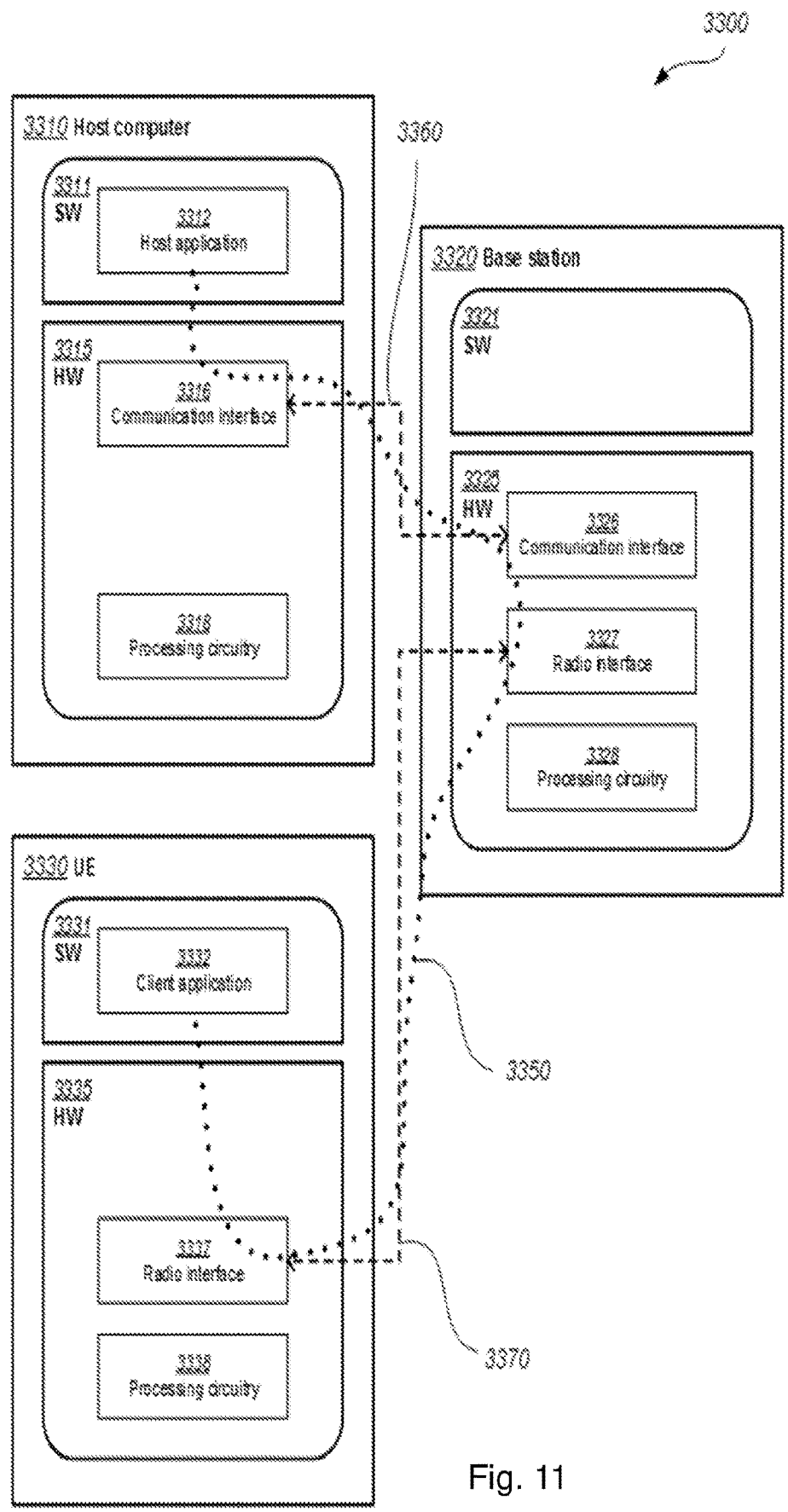
FIG. 11 is a generalized block diagram of a host computer communicating via a base station with a user equipment over a partially wireless connection.

It is noted that the host computer 3310, base station 3320 and UE 3330 illustrated in FIG. 11 may be identical to the host computer 3230, one of the base stations 3212a, 3212b, 3212c and one of the UEs 3291, 3292 of FIG. 10, respectively. This is to say, the inner workings of these entities may be as shown in FIG. 11 and independently, the surrounding network topology may be that of FIG. 10.

In FIG. 11, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the performance since the communication may be performed more reliably when flying and thereby provide benefits such as reduced user waiting time, and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a user equipment (UE) for handling communication in a wireless communication network, the method comprising:
   determining whether the UE is in a flying state or a non-flying state; and
   selecting a conditional handover (CHO) configuration and using the selected CHO configuration for CHO operation by the UE, the selection made by the UE in dependence on whether the UE is determined to be in the flying state or the non-flying state, and the selection being between a first CHO configuration applicable to the non-flying state or a second CHO configuration applicable to the flying state.

2. The method according to claim 1, further comprising receiving the first and second CHO configurations from a radio network node of the wireless communication network.

3. The method according to claim 1, wherein, as compared to the first CHO configuration, the second CHO configuration uses a shorter time to trigger (TTT) value for triggering handover.

4. The method according to claim 1, wherein the first and second CHO configurations are differentiated by one or more of:

different signal thresholds for triggering handover;
different events for triggering handover; or
different sets of CHO target cells.

5. The method according to claim 1, further comprising determining whether the UE is in the flying state or in the non-flying state based on internal sensors of the UE.

6. The method according to claim 1, further comprising determining whether the UE is in the flying state or in the non-flying state based on how many cells of the wireless communication network are detected by the UE at or above a defined signal quality or strength threshold.

7. A method performed by a radio network node for handling communication in a wireless communications network, the method comprising:
generating configuration information for a user equipment (UE), the configuration information indicating a first conditional handover (CHO) configuration for use by the UE when the UE is in a flying state, and a second CHO configuration for use by the UE when the UE is in a non-flying state; and
transmitting the configuration information to the UE.

8. The method according to claim 7, wherein, as compared to the first CHO configuration, the second CHO configuration uses a shorter time to trigger (TTT) value for triggering handover.

9. The method according to claim 7, wherein the first and second CHO configurations are differentiated by one or more of:
different signal thresholds for triggering handover;
different events for triggering handover; or
different sets of CHO target cells.

10. A user equipment (UE) configured for operation in a wireless communication network, wherein the UE comprises:
a radio transceiver configured for communicating with radio network nodes of the wireless communication network; and
processing circuitry operatively associated with the radio transceiver and configured to:
determine whether the UE is in a flying state or a non-flying state; and
select a conditional handover (CHO) configuration and use the selected CHO configuration for CHO operation by the UE, the selection made by the UE in dependence on whether the UE is determined to be in the flying state or the non-flying state, and the selection being between a first CHO configuration applicable to the non-flying state or a second CHO configuration applicable to the flying state.

11. A radio network node configured for operation in a wireless communications network, wherein the radio network node comprises:
a radio transceiver configured for communicating with a user equipment (UE); and
processing circuitry operatively associated with the radio transceiver and configured to:
generate configuration information for a user equipment (UE), the configuration information indicating a first conditional handover (CHO) configuration for use by the UE when the UE is in a flying state, and a second CHO configuration for use by the UE when the UE is in a non-flying state; and
transmit the configuration information to the UE.

* * * * *